United States Patent [19]

Rosenau et al.

[11] 4,066,800

[45] Jan. 3, 1978

[54] PREPARATION OF DAIRY-BASED CHEESE FOOD

[75] Inventors: John R. Rosenau, Amherst, Mass.; John C. Anderson, St. Paul, Minn.

[73] Assignee: The Regents of the University of Minnesota, Minneapolis, Minn.

[21] Appl. No.: 420,444

[22] Filed: Nov. 30, 1973

[51] Int. Cl.$^2$ .................. A23C 19/02; A23C 19/12
[52] U.S. Cl. .................... 426/582; 426/585
[58] Field of Search .......... 426/36, 39, 40, 185, 426/186, 361, 364, 585, 582; 260/112, 120

[56] References Cited

U.S. PATENT DOCUMENTS

| | | | |
|---|---|---|---|
| 2,832,685 | 4/1958 | Scott | 426/185 |
| 2,878,126 | 3/1959 | Roberts | 426/186 |
| 3,089,776 | 5/1963 | Ernstrom | 426/39 |

OTHER PUBLICATIONS

Kosikowski, F., Cheese and Fermented Milk Foods, Published by the Author, Cornell University, N.Y., 1966, (pp. 794, 796 and 302).

Ernstrom, C. A., Mechanized "Pizza Cheese" Making, Manufactured Milk Products Journal, vol. 57, No. 7, 1965, (pp. 7-8).

*Primary Examiner*—David M. Naff
*Attorney, Agent, or Firm*—Burd, Braddock & Bartz

[57] ABSTRACT

A dairy based cheese food is prepared by a process involving heating milk to pasteurize and denature whey proteins, acidifying the milk to form curd and whey, separating the curd from the whey, neutralizing the curd by adding a base, mixing an acid with the neutralized curd to reacidify, mixing an additive with the curd, manipulating the curd such as by extrusion, and packaging the curd.

4 Claims, 1 Drawing Figure

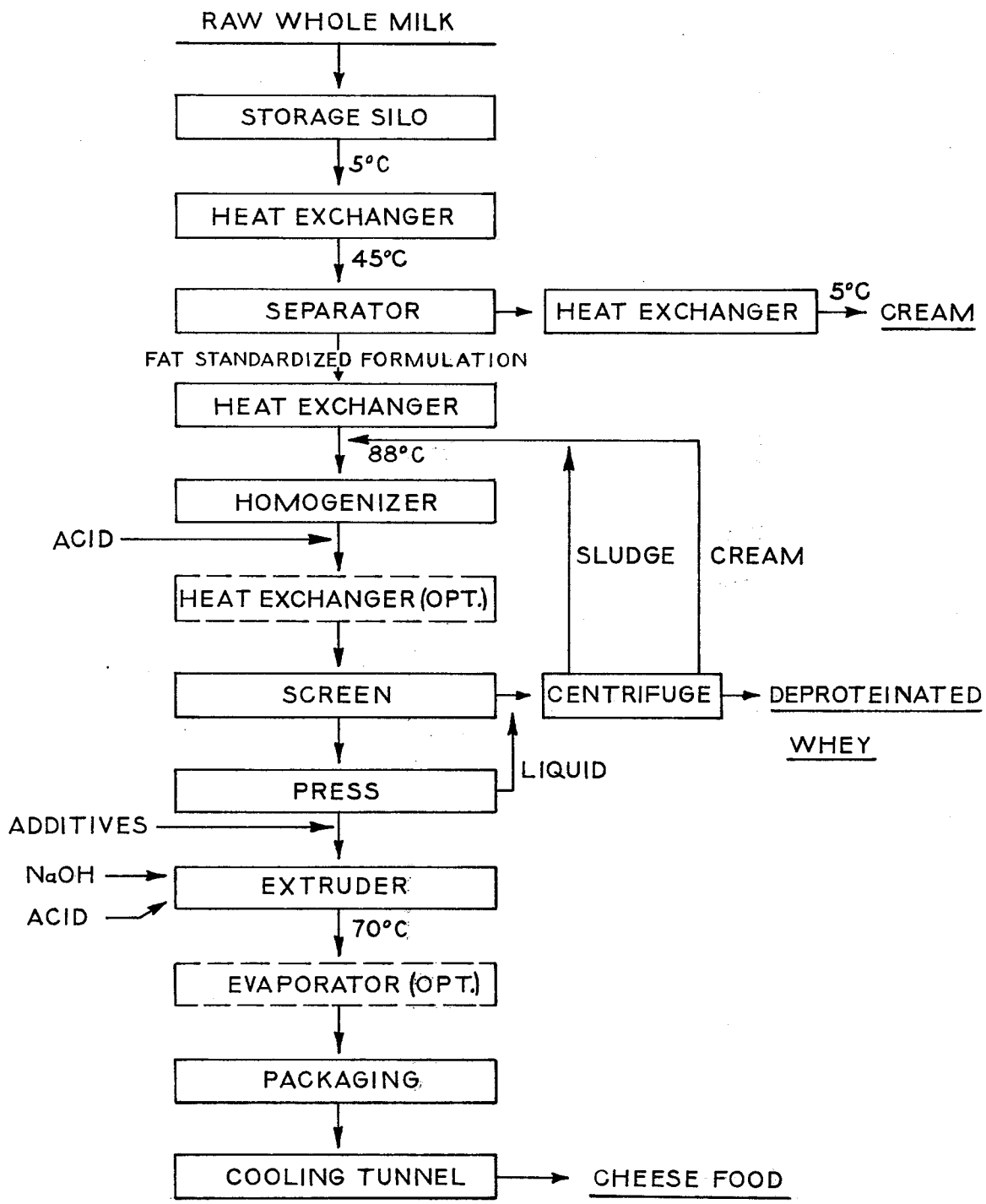

PREPARATION OF DAIRY-BASED CHEESE FOOD

This invention is directed to a process for the production of dairy-based cheese food products prepared by coprecipitating casein, whey protein and fat from milk by heating and acid precipitation.

BACKGROUND OF THE INVENTION

Various manufacturers are marketing equipment to mechanize the production of Cheddar and Colby cheese. This equipment provides for the mechanization of age-old methods of cheese production rather than providing new dairy-based foods with the same or better sensory and nutritional properties as cheese. This invention is based on research examining the feasibility of making new cheese foods by processes adaptable to mechanization by producing coprecipitates of milk that are then modified by extrusion processing and the addition of food additives and flavors to resemble Cheddar or processed Cheddar at lowered cost.

THE PRIOR ART

In the past, some cheeses have been made by methods which resemble the initial steps of the herein described process. For example, Ricotta cheeses are made by heating (about 88° C) and adding acid (usually lactic, acetic or citric) to whole or part skim milk. The curds produced float to the top of the vat due to occlusion of gases. Impastata and Queso Blanco cheeses are produced in a similar fashion but conditions are slightly modified to produce a sinking curd. These cheeses produced by direct acidification have textures quite different from commonly accepted Cheddar, Colby and processed cheeses, the pressed cheeses being hard, granular, crumbly and suitable as grating cheeses.

SUMMARY OF THE INVENTION

Broadly stated, the process of the present invention comprises standardizing milk in the normal manner to the desired fat content. Following standardization, the milk is further heated in order to pasteurize it and to denature the whey protein. Following heating, the milk is acidified, thus forming curd particles of coprecipitate. The curds and whey are agitated to allow the curds to equilibrate with the whey. The curds are filtered from the whey and pressed. Alkali is added to neutralize the coprecipitate, thus solubilizing the proteins. The coprecipitate is then reacidified and food additives and flavorings are added. The resulting product may be extruded, packaged, etc., in the usual manner.

This precipitation method has several advantages:

1. The denaturable whey proteins are included in the final product, increasing its yield.
2. Inclusion of the whey proteins tends to soften the cheese. This allows the production of a lowered fat content cheese without the tough rubber-like consistency that often accompanies such cheeses. The cheese food thus has special appeal to consumers conscious of their caloric or their saturated fat intake.
3. Continuous production equipment may be used which is more amenable to clean-in-place design and automatic control and which takes up less room than conventional equipment.
4. The product may be placed in the final package at the time of manufacture, eliminating the labor and waste associated with repackaging.
5. Aging times may be eliminated.
6. Microbial starter cultures are eliminated.
7. Vegetative cells of contaminating bacteria are destroyed.

BRIEF DESCRIPTION OF THE DRAWING

The invention is illustrated in the accompanying drawing, which is a flow sheet showing schematically the steps of one exemplary embodiment of the process.

DESCRIPTION OF THE PREFERRED EMBODIMENT

The milk starting material may be, for example, whole milk or skim milk, homogenized or non-homogenized, filled (as with vegetable oil, such as cottonseed or corn oil) milk, or the like. Milk with between about 2% to 3.5% fat has been used successfully.

Although heating of the starting milk material is not essential, it is desirable that the milk be heated to about 180° to 200° F (82° to 93° C) to pasteurize the milk and to denature the whey proteins. The higher the temperature used, the more the whey proteins are denatured and are collected with the precipitated curd. Whey proteins tend to bind more water than casein and thus increase the weight yield by this mechanism in addition to inclusion of these fractions. Whey proteins tend to break up the casein matrix and thus to soften the product. An additional benefit obtained by denaturing the whey proteins is their reduction or absence in the whey stream, thus simplifying lactose crystallization and recovery from the whey.

The heated milk is then acidified to between about pH 5.1 to 4.2 (preferably about pH 4.4) with continuous agitation. Dilute hydrochloric acid is a preferred acidifying acid. Alternatively, other organic and inorganic acids may be used for this purpose to the extent that they are permissible in food products including, for example, acetic, fumaric, malic, citric, phosphoric, and the like. Curd particles of coprecipitate are formed as the result of acidification. The acidification is initiated after the high temperature is reached and cooling begun. The curds and whey are agitated to allow the curds to equilibrate with the whey. Further additions of acid are made as relaxation effects move the pH upward during holding time.

The curd and whey are then separated initially by filtering or centrifuging. For example, a horizontal bowl desludging (decanting) centrifuge may be used. Because neither product stream is totally separated in the decanting operation, it is desirable to separate further curd particles from the decanted whey stream by an intermittently desludging plate centrifuge and return the recovered sludge to the curd harvest. Further expulsion of whey from the separated curd is accomplished by pressing in cheese hoops, or, in the case of a mechanized process, in a continuous pressing operation. Pressing effectiveness is enhanced by maintaining a relatively low pH.

Following separation of the whey, the coprecipitate is mixed with sufficient amounts of a base to raise the pH to from about 6.5 to 9, preferably about 7, to solubilize the proteins. A solution of sodium hydroxide may be employed to neutralize the product. Other hydroxide solutions may be used such as potassium hydroxide if it is desired to minimize sodium ion for considerations of special diets. Additionally, other basic salts may be substituted in part or in total for sodium and potassium hydroxides. Because calcium hydroxide is notably less soluble, control of the reaction rate of neutralization may be possible with its use. Various alkali phosphates, carbonates, citrates, and the like, will likewise accomplish the increased solubilization of the proteins by increasing the pH. The alkali cation of these salts may be selected according to consideration of diet or of texture alteration. Divalent cations such as calcium and magnesium can alter texture. Mixing has been undertaken as the product was heated to 160° F or more without indication of a critical need for strict temperature control. The curds are manipulated during mixing, as in an extruder.

Following neutralization, the coprecipitate is then reacidified to about pH 5.0 to 5.6 and preferably to about pH 5.3. Lactic acid is the preferred acidulent, although other weakly ionizable organic and inorganic acids, including acetic, fumaric, malic, citric, etc., may be used. Lactic acid is the preferred acidulent because it is believed that the lactate ion serves as a bacteriostatic agent to enhance shelf stability. Furthermore, it can easily be incorporated at concentrated levels into the product, in contrast to an acid like hydrochloric acid which evolves offensive hydrogen chloride gas when concentrated acid is added to the melted dough product.

During the mixing steps, food additives such as table salt, coloring, dibasic sodium phosphate ($Na_2HPO_4$), calcium chloride, flavorings (including Cheddar cheese and/or Cheddar cheese slurries), stabilizers and preservatives, and the like, are added depending upon the desired final cheese food product. A well-melted dough is achieved with mixing and heating. The melted product is desirably transferred directly to containers for final packaging and then refrigerated. The resulting product has good texture and flavor, resembling Cheddar cheese-type products. If 2% fat milks are used, it has relatively low fat content of about 17% fat, as opposed to about 35% fat in Cheddar cheese. The cheese food product contains about 30% protein. For a product of this composition, a yield rate of about 11.1% is expected (i.e., 11.1 kilograms product per 100 kilograms milk).

One of the problems associated with extruder processing is feeding the material into and through the machine at a uniform rate. This becomes especially crucial if the additives used are fed into the extruder by metering pumps independently of the bulk of material. While there are several ways a commercial system might overcome this problem, it was found that the following worked well with a laboratory-sized Wenger X-5 extruder for the difficult to handle pastes involved with this process. A sausage stuffer of the type which uses a floating piston powered by water pressure was used to force feed a Moyno pump which in turn metered the flow to the extruder. Experience with this system indicates that there would be little problem with the extrusion area of a commercial system.

The invention is further illustrated by means of the following examples:

EXAMPLE 1

One hundred kilograms raw whole milk (3.8% fat) from a storage silo maintained at 5° C was warmed to 45° C and separated using a plate-type centrifuge dairy separator. Cream was combined with the skim milk to make a 2% standardized milk formulation which was raised to about 88° C and homogenized. Following heating, the milk was acidified to pH 4.4 by the addition of 1 N hydrochloric acid. The curds and whey were agitated for about two hours with further additions of acid to allow the curds to equilibrate with the whey. After acidification, the curds and whey were separated by initial use of a horizontal bowl desludging centrifuge. Further expulsion of whey from the separated curd was accomplished by pressing in cheese hoops. A five pound batch of coprecipitate was then mixed with sufficient 10 N sodium hydroxide to raise the pH to about 7. Product mixing and working was accomplished using a motorpowered batch mixer (Ross mixer) equipped with a water jacket for temperature control and evacuated by an arrangement employing a water aspirator. Then, about 11.4 grams of sodium chloride and 2.3 milliliters of annato cheese color were added. Heating was applied through the chamber walls from 160° F water circulated within the jacket. A well-melted dough was achieved with mixing and heating. As mixing continued, lactic acid was added to obtain a final pH of about 5.3 The melted product was transferred to two pound loaf process cheese boxes and refrigerated.

EXAMPLES 2-6

Further cheese food products were prepared using different milk formulations of different fat content, homogenized and non-homogenized and including dairy and non-dairy fat. Substantially the same procedure as described in Example 1 was followed. The results are summarized in the table:

| Example No. | 2 | 3 | 4 | 5 | 6 |
|---|---|---|---|---|---|
| Milk Formulations | | | | | |
| % Fat | 3.5 | 2.0 | 2.0 | 3.5 | 2% |
| Type Fat | Dairy | Dairy | Dairy | Dairy | Corn Oil |
| Homogenization | None | None | Two stage | Two stage | Two stage |
| Base Added** | | | | | |
| ml 10N NaOH | 40, 50* | 40 | 50 | 50 | 35 |
| Indicated pH | 6.2, 6.7* | 9.4 | 7.1 | 8.6 | 7.0 |
| Acid Added** | | | | | |
| ml 80% lactic acid | 40 | 35 | 35, 37 | 35, 40 | 25 |
| Indicated pH | 4.8 | 5.35 | 5.4 | 5.6, 5.35 | 5.35 |
| Back Titration** | | | | | |
| Additional ml 10N NaOH | 10, 15* | — | — | — | — |
| Indicated pH | 5.1, 5.3* | — | — | — | — |

*Indicated pH suggested further additions. Second number indicates cumulative additions and reactions.
**Amounts of additions are on basis of 5 pound batch of harvested coprecipitate.

Although significant variation was shown in the intermediate and end products, all formulations processed according to these examples have produced homogenous and apparently stable cheese foods.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process for production of a dairy-based cheese food which comprises the steps of:
   A. preparing a milk formulation of fat content from about 2 to 3.5%,
   B. heating the milk to pasteurize the same and to denature the proteins,
   C. acidifying the milk while still heated and with agitation to between about pH 4.2 and 5.1 to form curd particles,
   D. while maintaining the pH, separating the curds from the resulting whey,
   E. mixing a base with the curds to neutralize the same to between about pH 6.5 and 9 to solubilize the proteins,
   F. mixing an acid with the neutralized curds to reacidify to about pH 5.3,
   G. during mixing introducing at least one additive selected from the group consisting of coloring agents, flavoring agents, stabilizers and preservatives,
   H. manipulating the curds during mixing, and
   I. directly packaging the cheese food product.

2. A process according to claim 1 further characterized in that said milk formulation is a standardized natural dairy milk.

3. A process according to claim 1 further characterized in that said milk formulation is a standardized filled milk.

4. A process according to claim 1 further characterized in that manipulation is in an extruder.

* * * * *